(12) United States Patent
Oi (10) Patent No.: US 8,660,357 B2
(45) Date of Patent: Feb. 25, 2014

(54) IMAGE PROCESSING APPARATUS, METHOD, AND COMPUTER PROGRAM

(75) Inventor: Shunsuke Oi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 557 days.

(21) Appl. No.: 13/020,391

(22) Filed: Feb. 3, 2011

(65) Prior Publication Data
US 2011/0194785 A1    Aug. 11, 2011

(30) Foreign Application Priority Data
Feb. 9, 2010   (JP) .................. 2010-026266

(51) Int. Cl.
*G06K 9/00*   (2006.01)
*G06K 9/18*   (2006.01)
(52) U.S. Cl.
USPC .......................................... 382/182; 382/294
(58) Field of Classification Search
USPC ........................................ 382/181–189, 294
See application file for complete search history.

(56) References Cited

U.S. PATENT DOCUMENTS

| 7,796,817 B2 * | 9/2010 | Hotta et al. .................... 382/181 |
| 2007/0109585 A1 * | 5/2007 | Tanaka et al. ................ 358/1.14 |
| 2009/0284777 A1 | 11/2009 | Imai | |

FOREIGN PATENT DOCUMENTS

| CN | 1968343 A | 5/2007 |
| JP | 2007-094620 | 4/2007 |

* cited by examiner

Primary Examiner — Wesley Tucker (57) ABSTRACT

An overlap determining unit determines whether or not a stamp character string is readable using image data of a stamp image and image data of a scan image read by a scanner unit when the stamp image and the scan image area overlapped. A stamp image generating unit generates a correction stamp image obtained by correcting the stamp image to improve readability of the stamp characters when it is determined that the stamp characters are not readable. A synthesis image generating unit generates a synthesis image in which the correction stamp image and the scan image are overlapped. A printer unit forms the synthesis image on a printing medium.

7 Claims, 8 Drawing Sheets

IMAGE PROCESSING APPARATUS, METHOD, AND COMPUTER PROGRAM

BACKGROUND

1. Technical Field

The present invention relates to stamp synthesis copy of overlapping and printing a stamp character string on an original image, and more particularly, to a technique of easily reading a stamp character string.

2. Related Art

There is a stamp character synthesis copy function for reduplicating characters, which are not in an original document, on a printed copy when copying a document (e.g., JP-A-2007-94620).

In the stamp character synthesis copying of the related art, a user designates a position of stamp characters synthesized at the copying start time, and the stamp characters are disposed at the position to print a synthesized image, thereby performing copying. In this case, the stamp characters may be overlapped with characters or the like in an original document, and thus it sometimes becomes difficult to read the document. In the case of an original document with a plurality of pages, there are pages on which stamp characters can be easily read and pages on which stamp characters cannot be easily read.

This shares the same problem regarding stamp synthesis copying for reduplicating a repeated pattern of the same characteristic string (stamp character string) with an original document as an aspect of watermark characters.

SUMMARY

An advantage of some aspects of the invention is to provide stamp synthesis copying capable of easily reading a stamp character string.

An image processing apparatus includes: a storage unit that stores a first image including a stamp character string including one or more elemental characters; a determination unit that determines whether or not the stamp character string is readable using image data of the first image and image data of a second image read by a scanner when the first image and the second image are overlapped; a generation unit that generates a third image obtained by correcting the first image to improve readability of the stamp characters using the image data of the first image when the determination unit determines that the stamp character string is not readable; and a synthesis unit that generates a synthesis image in which the second image and the third image are overlapped.

With such a configuration, a copy in which a stamp character string is reliably readable is generated by the stamp synthesis copying.

In the image processing apparatus, the determination unit may determine that the stamp character string is readable when at least one or more characters for each kind of elemental characters constituting the stamp character string are not overlapped with a pixel having a pixel value of the second image equal to or more than a predetermined value.

With such a configuration, at least one character for each elemental character is displayed without being overlapped with the pixel in which the pixel value of the second image is equal to or more than the predetermined value, and thus it is possible to read the stamp character string.

In the image processing apparatus, the generation unit may shift the stamp character string of the first image in a parallel manner to generate the third image such that at least one or more characters for each kind of elemental characters constituting the stamp character string are not overlapped with a pixel having a pixel value of the second image equal to or more than a predetermined value.

With such a configuration, in the third image which can be obtained by correcting the first image, at least one character is displayed without being overlapped with the pixel in which the pixel value of the second image is equal to or more than the predetermined value.

In the image processing apparatus, the generation unit may shift the stamp character string of the first image in a parallel manner to generate the third image such that any of two or more continuous characters of the elemental character constituting each stamp character string are not overlapped with a pixel having a pixel value of the second image equal to or more than a predetermined value when the number of elemental characters is 3 or more.

With such a configuration, two or more characters in which the elemental characters of the stamp character string are continuous are displayed without being overlapped with the pixel in which the pixel value of the second image is equal to or more than the predetermined value, and thus readability becomes high.

In the image processing apparatus, the determination unit may determine that the stamp character string is readable when at least one or more characters for each kind of elemental character constituting the stamp character string are readable, and determine that the elemental characters are readable when the number of overlapped pixels of an intersection point and pixels of an isolation pixels in the elemental characters with pixels having a pixel value of the second image equal to or more than a predetermined value is equal to or less than a predetermined number.

With such a configuration, a characteristic part of at least one character of each elemental character is displayed.

In the image processing apparatus, when the scanner continuously reads a plurality of pages of the second image, the determination unit may determine whether or not the stamp character string is readable for each of the plurality of pages, and the generation unit may generate the third image for each page for which the determination unit determines that the stamp character string is not readable.

With such a configuration, when the second image of the plurality of pages is continuously read, readability of the stamp character string for each page is determined, and it is possible to secure readability for all the pages.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an image processing apparatus according to an embodiment of the invention will be described with reference to the drawings.

Figure 1:
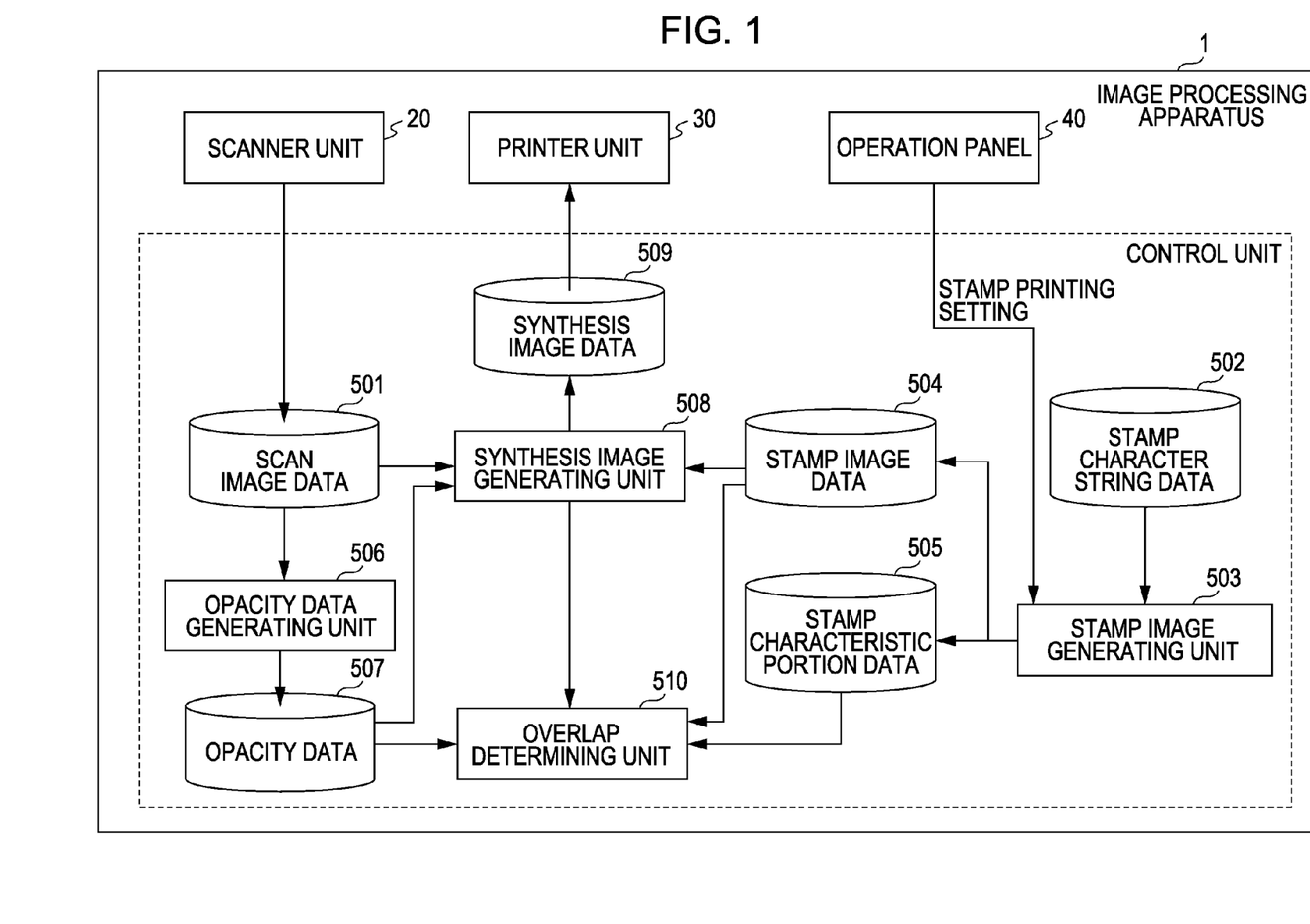
FIG. 1 is a diagram illustrating a configuration of an image processing apparatus according to an embodiment of the invention.

FIG. 1 is a diagram illustrating a configuration of an image processing apparatus 1 according to the embodiment. The image processing apparatus 1 according to the embodiment is provided with a scanner unit 20, a printer unit 30, and an operation panel 40, and a control unit 50.

The image processing apparatus 1 is provided with a processor, a memory, and the like (not shown), and executes a predetermined computer program to realize individual constituent elements or functions of the control unit 50 to be described below. All or a part of the program may be stored in a predetermined recording medium and distributed, or may be transmitted through a network.

The scanner unit 20 reads an image of an original document, and acquires image data (scan image data) of the image of the original document. For example, the image processing apparatus 1 has a document base (not shown), and the scanner unit 20 may scan the original document on the document base. The control unit 50 performs processes to be described below on the basis of the scan image data read by the scanner unit 20.

The printer unit 30 forms an image on a printing medium according to an instruction from the control unit 50. For example, the printer unit 30 may be a printing mechanism such as an ink jet printer or a laser printer.

The control unit 50 is provided with a scan image data storing unit 501, a stamp character string data storing unit 502, a stamp image generating unit 503, a stamp image data storing unit 504, a stamp characteristic portion data storing unit 505, an opacity data generating unit 506, an opacity data storing unit 507, a synthesis image generating unit 508, a synthesis image data storing unit 509, and an overlap determining unit 510.

The scan image data storing unit 501 stores the image data (scan image data) of the scan image (second image) read by the scanner unit 20. The scan image data storing unit 501 is, for example, a RAM having a capacity in which image data of one page can be stored, and values of pixels of the scan image may be stored in the RAM.

The stamp character string data storing unit 502 stores image data of a stamp character string to generate a stamp image. The stamp character string is a pattern image for generating the stamp image. The stamp character string is a character string including one or more predetermined elemental characters, for example, top secret "Confidential" surrounded by a circle, "DO NOT COPY" surrounded by a frame, or "copy" surrounded by a frame.

The stamp image generating unit 503 generates a stamp image (first image) including a plurality of stamp character strings including one or more elemental characters. Image data of the stamp image generated by the stamp image generating unit 503 is stored in the stamp image data storing unit 504.

For example, the stamp image generating unit 503 generates the stamp image according to stamp printing setting by a user receiving input through the operation panel 40. For example, the stamp printing setting includes a kind or the like of the stamp character string.

Figure 2A:
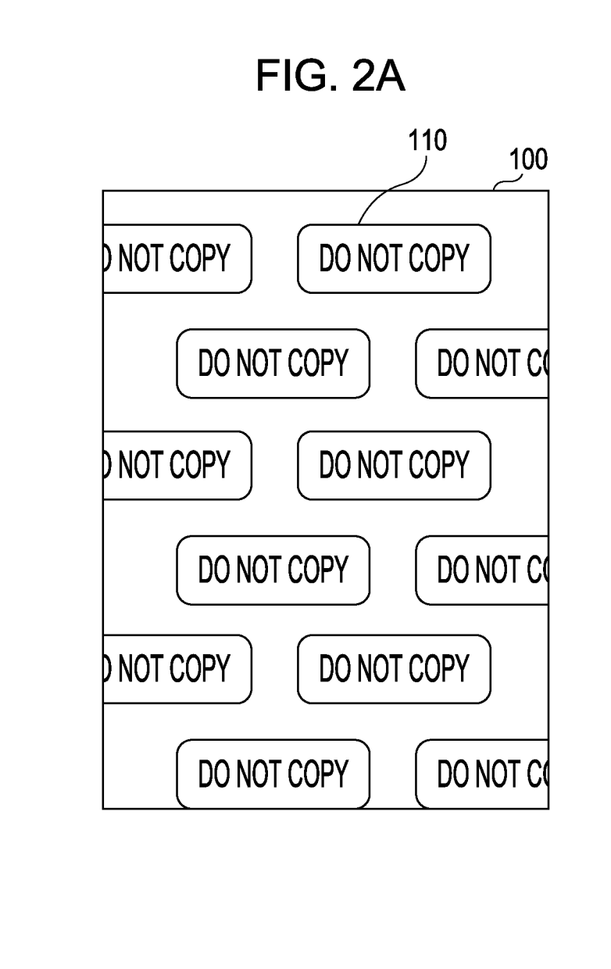
FIG. 2A and FIG. 2B are diagrams illustrating an example of a stamp image generated by a stamp image generating unit.
Figure 2B:
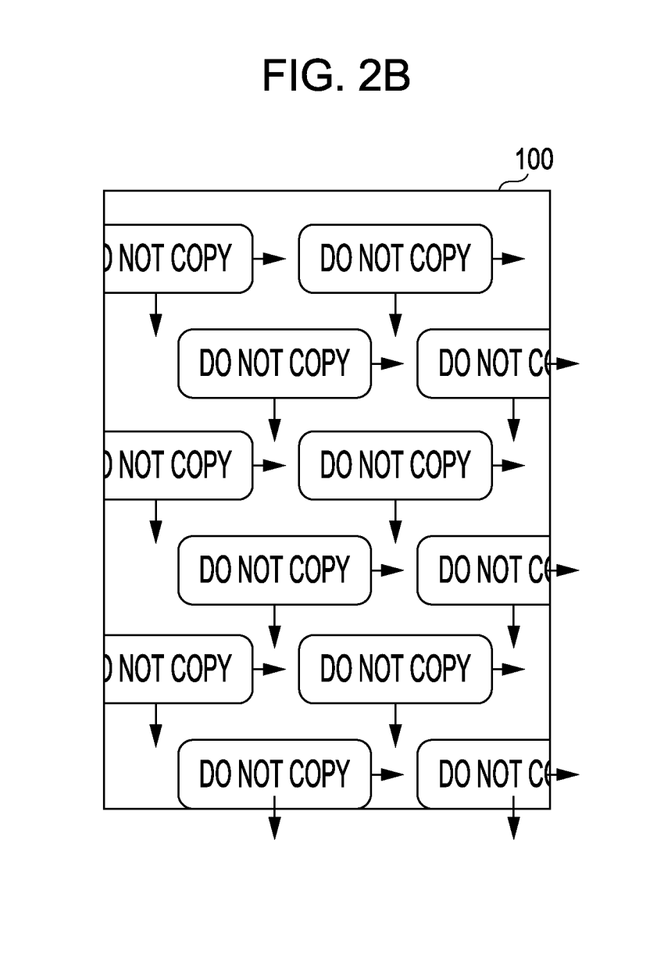

FIG. 2A and FIG. 2B show an example of the stamp image 100 generated by the stamp image generating unit 503. In the example of the FIG. 2A and FIG. 2B, in the stamp printing setting, the stamp image 100 is shown when the stamp character string of "DO NOT COPY" surrounded by the frame is selected as the kind of the stamp character string. The stamp image generating unit 503 disposes a plurality of stamp character strings 110 (in FIG. 2A and FIG. 2B, the reference numeral is given to only one part) in a layout which can be predetermined, according to a printing paper size. For example, in the stamp image 100 shown in FIG. 2A and FIG. 2B, the plurality of stamp character strings 110 are disposed in a regular period.

When the overlap determining unit 510 determines that the stamp character string is not readable (details will be described below), the stamp image generating unit 503 generates a correction stamp image (third image) obtained by correcting the stamp image to improve readability of the stamp character string using image data (stamp image data) of the stamp image (first image). Image data of the correction stamp image is also stored in the stamp image data storing unit 504.

The correction stamp image (third image) may be an image in which the stamp character string of the stamp image (first image) is parallel shifted such that at least one or more characters for each kind of elemental character constituting the stamp character string are not overlapped with a pixel having a pixel value of the scan image (second image) equal to or more than a predetermined value. When the number of elemental characters of the stamp character string is 3 or more, the correction stamp image (third image) may be an image in which the stamp character string of the stamp image (first image) is parallel shifted such that any two continuous characters or more of element characters constituting each stamp character string are not overlapped with a pixel having a pixel value of the scan image (second image) equal to or more than a predetermined value. For example, as shown in FIG. 2B by arrows, the stamp character string may be parallel shifted by a predetermined number of pixels in a horizontal direction or a vertical direction. Alternatively, the stamp image generating unit 503 may generate the correction stamp image by enlarging or reducing the stamp character string. The correction stamp image will be described in detail below.

When a plurality of pages are continuously read by the scanner unit 20, the stamp image generating unit 503 may generate the correction stamp image for each page for which it is determined that the stamp character string is not readable by the overlap determining unit 510.

Referring to FIG. 1, the stamp image data storing unit 504 stores image data of the stamp image or the correction stamp image generated by the stamp image generating unit 503. The stamp image data storing unit 504 is formed of, for example, a RAM, and may store pixel values of the stamp image or the correction stamp image in the RAM.

The stamp image generating unit 503 extracts characteristic portions of the stamp character string included in the generated stamp image. For example, the stamp image generating unit 503 extracts characteristic portions of the elemental characters in the stamp character string included in the stamp image. The characteristic portions of the element characters may be intersection points or isolation points in the elemental characters.

Figure 3A:
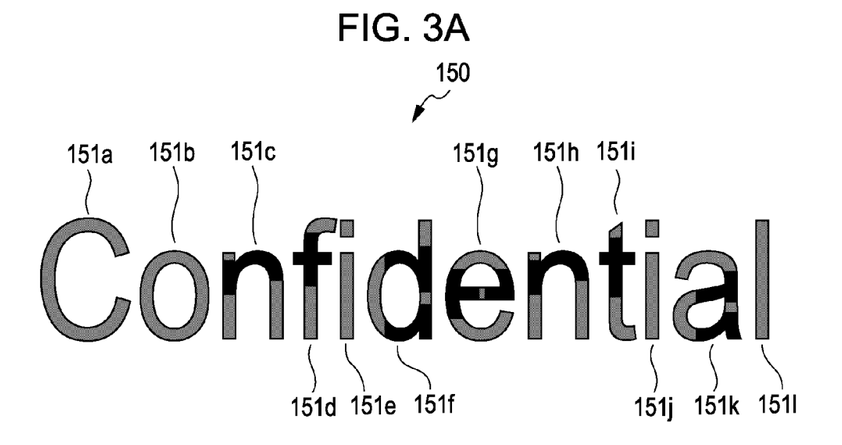
FIG. 3A and FIG. 3B are diagrams illustrating a stamp character string and characteristic portions of the stamp character string.
Figure 3B:
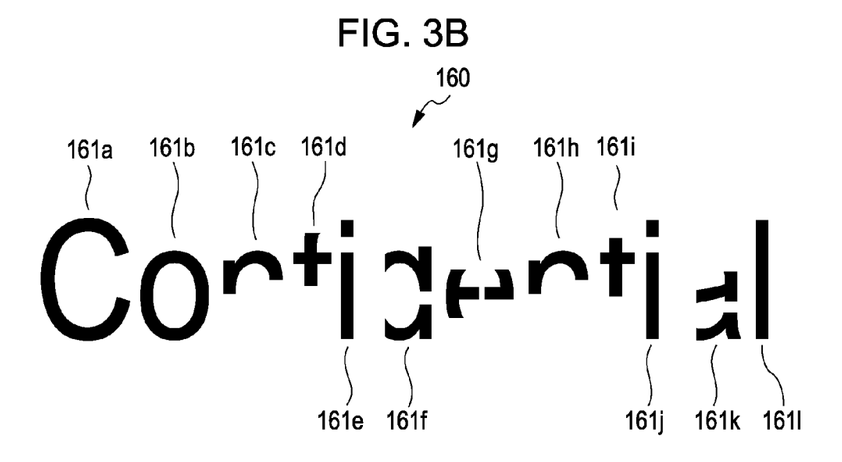

FIG. 3A and FIG. 3B are diagrams illustrating the characteristic portions of the stamp character string.

FIG. 3A is an enlarged diagram of "Confidential" that is an example of the elemental characters 150 of the stamp character string. FIG. 3B shows the characteristic portion 160 of the stamp character string. The characteristic portion 160 is formed by extracting characteristic portions 161a to 161l from intersection points of the strokes constituting each character and isolation points which do not intersect the other strokes, in the element characters 151a to 151l of the stamp character string.

The stamp image generating unit 503 extracts pixels of the intersection points and the isolation points of the elemental characters in the stamp character string, and specifies positional coordinates of the extracted pixels in the stamp image. The stamp image generating unit 503 stores a bitmap indicating the positional coordinates in the stamp characteristic data storing unit 505.

Figure 4A:
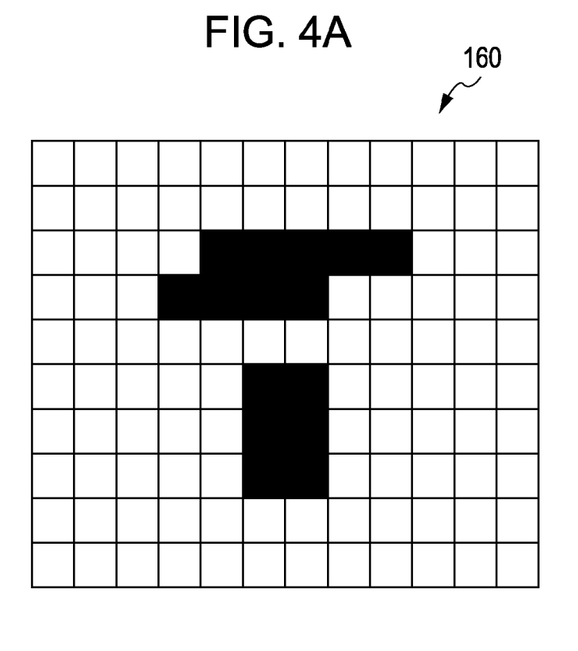
FIG. 4A and FIG. 4B are diagrams illustrating a characteristic portion of a stamp character.
Figure 4B:
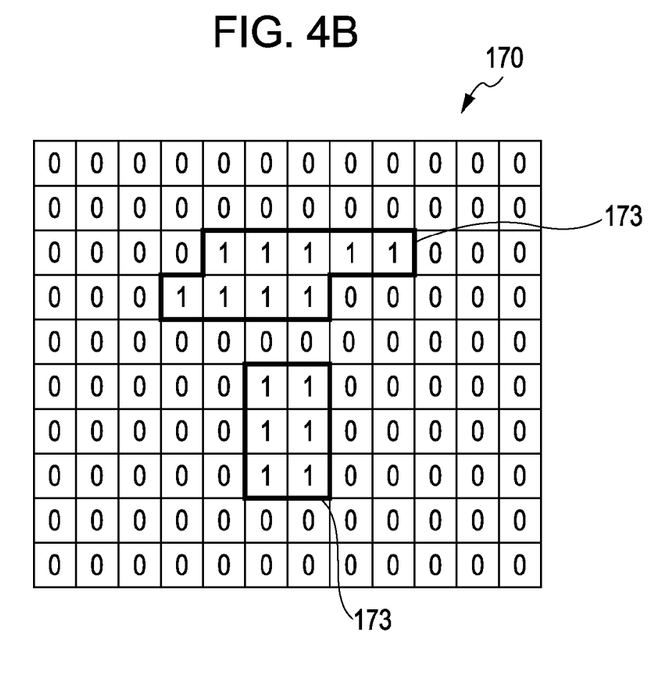

FIG. 4A is an enlarged diagram illustrating the characteristic portion 160 of the stamp character string, and FIG. 4B is the bitmap 170 indicating distribution of the characteristic portion 160 of the stamp character string. That is, when the intersection points and the isolation points of the elemental character in the stamp character string are distributed as shown in FIG. 4A, the bitmap 170 indicating the distribution state thereof is as shown in FIG. 4B.

The stamp characteristic portion data storing unit 505 is, for example, a RAM, and the bitmap 170 as shown in FIG. 4B is stored in the RAM.

The image data of the characteristic portion 160 of FIG. 3B may be stored in advance in the stamp character string data storing unit 502 with the image data of the stamp character string. The stamp image generating unit 503 may extract the characteristic portion data from the stamp character string data storing unit 502 on the basis of the above-described stamp printing setting to specify positional coordinates in which the characteristic portions of the stamp character string are distributed in the stamp image.

Referring to FIG. 1, the opacity data generating unit 506 generates opacity data indicating opacity of the scan image. The opacity data is stored in the opacity data storing unit 507.

Herein, the opacity is an indicator indicating how much priority to give the display of a target image with respect to the other image when the other image is overlapped with the target image. The opacity is determined by a value in the range in which a ratio of displaying pixel values of the target image is 0 to 100%, for example, for each pixel. This is the same way of thinking as the α channel. The opacity data generating unit 506 determines opacity such that a part such as characters, an object, and a photograph included in the scan image is printed on the front face.

Figure 5A:
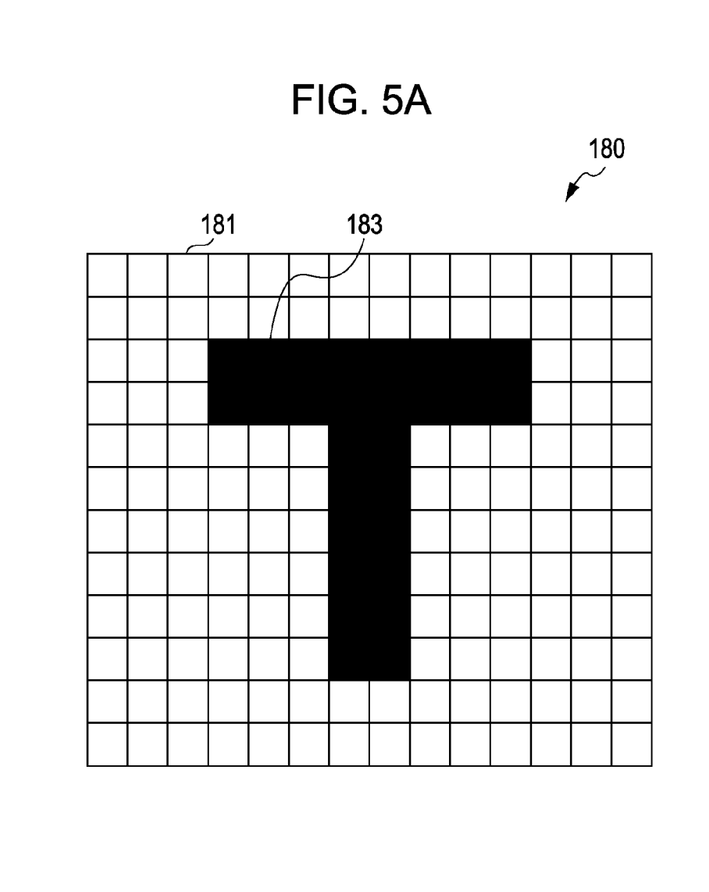
FIG. 5A and FIG. 5B are diagrams illustrating opacity.
Figure 5B:
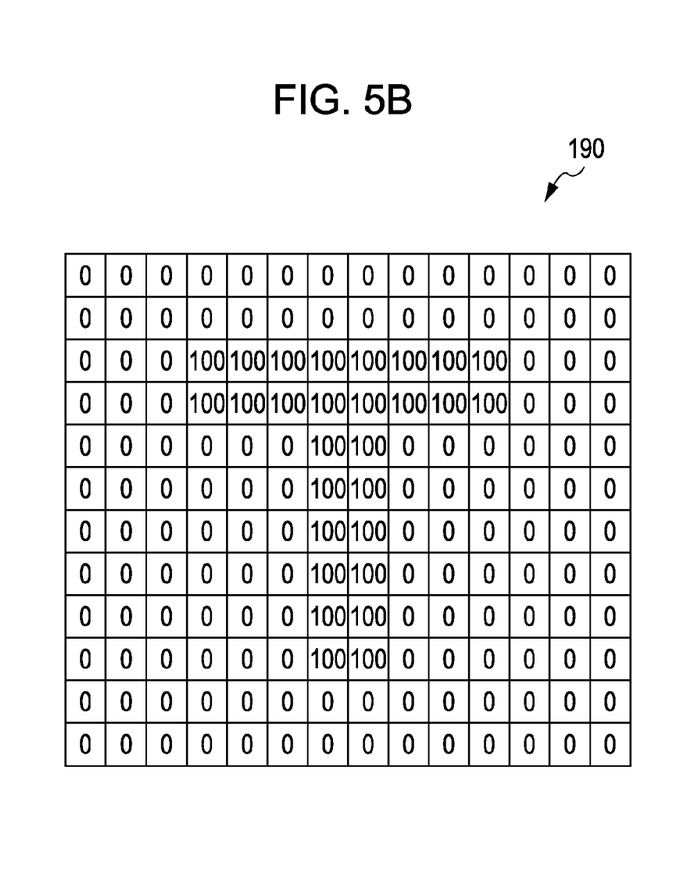

FIG. 5A and FIG. 5B are diagrams illustrating the opacity in the embodiment.

FIG. 5A is an enlarged diagram of the scan image 180, and a character of "T" is formed by pixels (black pixels) 183 having a predetermined pixel value with respect to pixels (white pixels) 181 having a pixel value of 0. FIG. 5B is opacity data 190 of the FIG. 5A.

For example, in the embodiment, the opacity data generating unit 506 generates opacity data by binarizing the scan image 180 shown in FIG. 5A into the pixels (black pixels) 183 having a pixel value equal to or more than a predetermined threshold value and the other pixels (white pixels) 181 having a pixel value less than the predetermined threshold value. That is, the opacity data generating unit 506 generates a bitmap as the opacity data 190 in which the opacity of the pixels having the pixel value equal to or more than the predetermined threshold value is 100% and the opacity of the pixels having the pixel value less than the predetermined threshold value is 0%. The bitmap is stored as the opacity data 190 in the opacity data storing unit 507. The opacity data generating unit 506 may set the values between 0 and 100% as opacity according to the pixel value.

Returning to FIG. 1, the synthesis image generating unit 508 generates a synthesis image in which the stamp image and the scan image are overlapped using the image data (stamp image data) of the stamp image (first image) and the image data of the scan image (second image) read by the scanner 20. The synthesis image generating unit 508 generates a synthesis image in which the correction stamp image (third image) and the scan image are overlapped when correction of the stamp image is necessary. The synthesis image data of the synthesis image generated by the synthesis image generating unit 508 is stored in the synthesis image data storing unit 509.

The synthesis image generating unit 508 generates a synthesis image by adding pixel values of the scan image 180 or the stamp image 100 for each pixel on the basis of the opacity data 190. For example, in the embodiment, the synthesis image generating unit 508 first determines values of the pixels of the synthesis image on the basis of the scan image data of the scan image data storing unit 501 so that the scan image 180 is the front face. For example, in the embodiment, the synthesis image generating unit 508 adds the pixel value of the stamp image data of the stamp image data storing unit 504 to the pixel value of the synthesis image for the pixels having the opacity of 0% with reference to the opacity data 190 of the opacity data storing unit 507. Meanwhile, the synthesis image generating unit 508 adds the pixel value of the scan image data for the pixels having the opacity of 100%, and does not add the pixel value of the stamp image data. Accordingly, the pixels having the opacity of 100% become only the pixel value of the scan image data, and the scan image is displayed on the front face of the stamp image. The same is applied to a case of synthesizing the correction stamp image with the scan image 180.

The synthesis image data storing unit 509 stores the synthesis image data. The synthesis image data storing unit 509 is, for example, a RAM having a capacity capable of storing image data of one page, and the values of the pixels of the synthesis image may be stored in the RAM.

The overlap determining unit 510 determines whether or not the stamp character string is readable when the stamp image (first image) and the scan image (second image) are overlapped.

Figure 6:
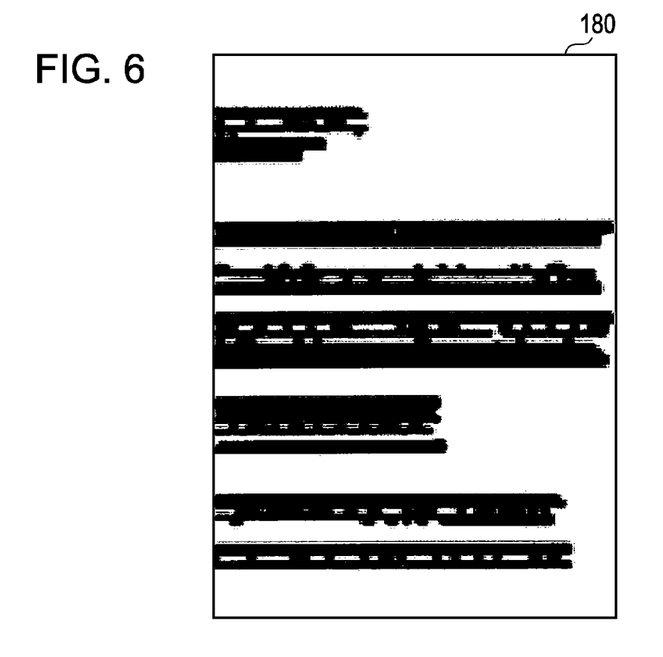
FIG. 6 is a diagram illustrating an example of a scan image.
Figure 7:
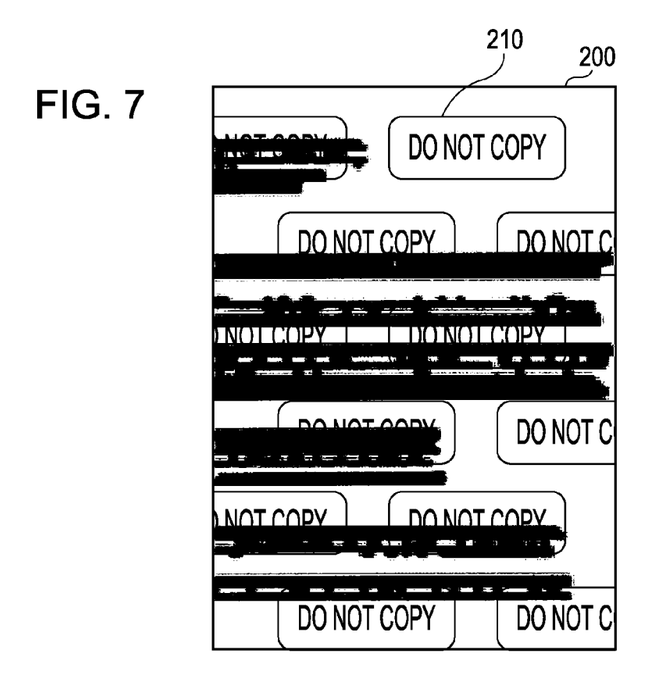
FIG. 7 is a diagram illustrating an example of a synthesis image.

FIG. 6 shows an example of the scan image 180, and FIG. 7 shows an example of the synthesis image 200. The synthesis image 200 shown in FIG. 7 is an image which can be obtained when the synthesis image generating unit 508 synthesizes the stamp image 100 shown in FIG. 2 with the scan image 180 shown in FIG. 6 according to the above-described sequence. In the synthesis image 200, the overlap determining unit 510 determines whether or not the stamp character string is readable.

For example, the overlap determining unit 510 may determine that the stamp character string is readable when at least one or more characters for each kind of the elemental characters constituting the stamp character string are not overlapped with the pixels having the pixel value of the scan image (second image) equal to or more than the predetermined value. A specific example thereof will be described hereinafter. That is, for example, when the stamp character string is "DO NOT COPY", the elemental characters of the stamp character string are "DO", "NOT", and "COPY". In this case, the stamp image 100 includes a plurality of "DO", "NOT", and "COPY", but it is determined that the stamp character string is readable when at least one or more characters of "DO", "NOT", and "COPY" are not overlapped with the pixels having the pixel values of the scan image equal to or more than the predetermined value.

In the synthesis image 200 shown in FIG. 7, none of "DO", "NOT", and "COPY" of the stamp character string 210 are overlapped with the pixels having the pixel value of the scan image equal to or more than the predetermined value, and are displayed in a complete form. Accordingly, in such a synthesis image 200, the stamp character string is determined as readable. In addition, the elemental character string ("DOT", "NOT", and "COPY"), which is not overlapped with the pixels having the pixel value of the scan image equal to or more than the predetermined value, may be divided into another stamp character string instead of only existing in the stamp character string 210 as in the example in FIG. 7. That is, it is preferable that, for each elemental character which is not overlapped with the pixels having the pixel value of the scan image equal to or more than the predetermined value, there exists at least one character in the synthesis image.

A specific processing sequence of the determination performed by the overlap determining unit 510 will be described. For example, the overlap determining unit 510 specifies positional coordinates at which the elemental characters in each stamp character string in the stamp image exist with reference to the stamp image data stored in the stamp image data storing unit 504. For example, the overlap determining unit 510 gives identification information to the elemental characters in all the stamp character strings which can be included in the stamp image. The identification information may be provided for each character kind (e.g., in the above example, for each of "DO", "NOT", and "COPY"). The overlap determining unit 510 detects positional coordinates of the pixels constituting the character of the identification information. That is, in the embodiment, the overlap determining unit 510 detects the positional coordinates of all the pixels in an area where strokes of the characters exist. The overlap determining unit 510 determines that there is no overlap for a character relating to the identification information with reference to the opacity data of the positions corresponding to the detected positional coordinates when all the opacities are equal to or less than a predetermined threshold value (e.g., 10%).

The overlap determining unit 510 may determine whether or not the stamp character string is readable in an aspect different from the above-described aspect. That is, the other aspect is that, for example, the overlap determining unit 510 determines that the stamp character string is readable when at least one or more characters for each kind of elemental character constituting the stamp character string are readable, and determines that the elemental characters are readable when the number of overlapped pixels of an intersection point and pixels of an isolation pixels in the elemental characters with pixels having a pixel value of the scan image (second image) equal to or more than a predetermined value is equal to or less than a predetermined number.

For example, the overlap determining unit 510 first specifies positional coordinates of the characteristic portion 160 with reference to the characteristic portion data of the stamp characteristic portion data storing unit 505. The overlap determining unit 510 searches for a pixel having a pixel value of "1" while scanning rightward from an upper left pixel in FIG. 4B as an origin in the bitmap of the characteristic portion data 170 shown in FIG. 4B. Upon reaching the right end, the detection is performed in the same manner one step thereunder. When the pixel having the pixel value of "1" is detected, the overlap determining unit 510 detects a pixel having the pixel value of "1" from adjacent pixels located above, below, left, and right, and specifies positional coordinates of an area of an intersection point or an isolation point. The positional information is stored as a positional coordinate group 173 indicating the area of one intersection point or the isolation point. Hereinafter, in the same manner, the positional coordinate group 173 indicating all the area of the intersection points and isolation points is detected.

Next, the overlap determining unit 510 extracts the opacity of the same positional coordinates as the position coordinate group 173 detected herein with reference to the opacity data 190 (FIG. 5B).

For example, the overlap determining unit 510 selects a set of positional coordinates of the positional coordinate group 173 detected by the above-described process with reference to the opacity data storing unit 507, and specifies the opacity of the position corresponding to the positional coordinates. For example, when the specified opacity is equal to or more than a predetermined threshold value (e.g., 90% or more), pixels of the characteristic portions of the elemental characters of the stamp character string corresponding to the positional coordinates are overlapped with the scan image having the pixel value equal to or more than the predetermined value. In such a manner, the overlap of the characteristic portions of the stamp character string with the pixels having the pixel value of the scan image equal to or more than the predetermined value is determined.

Figure 8:
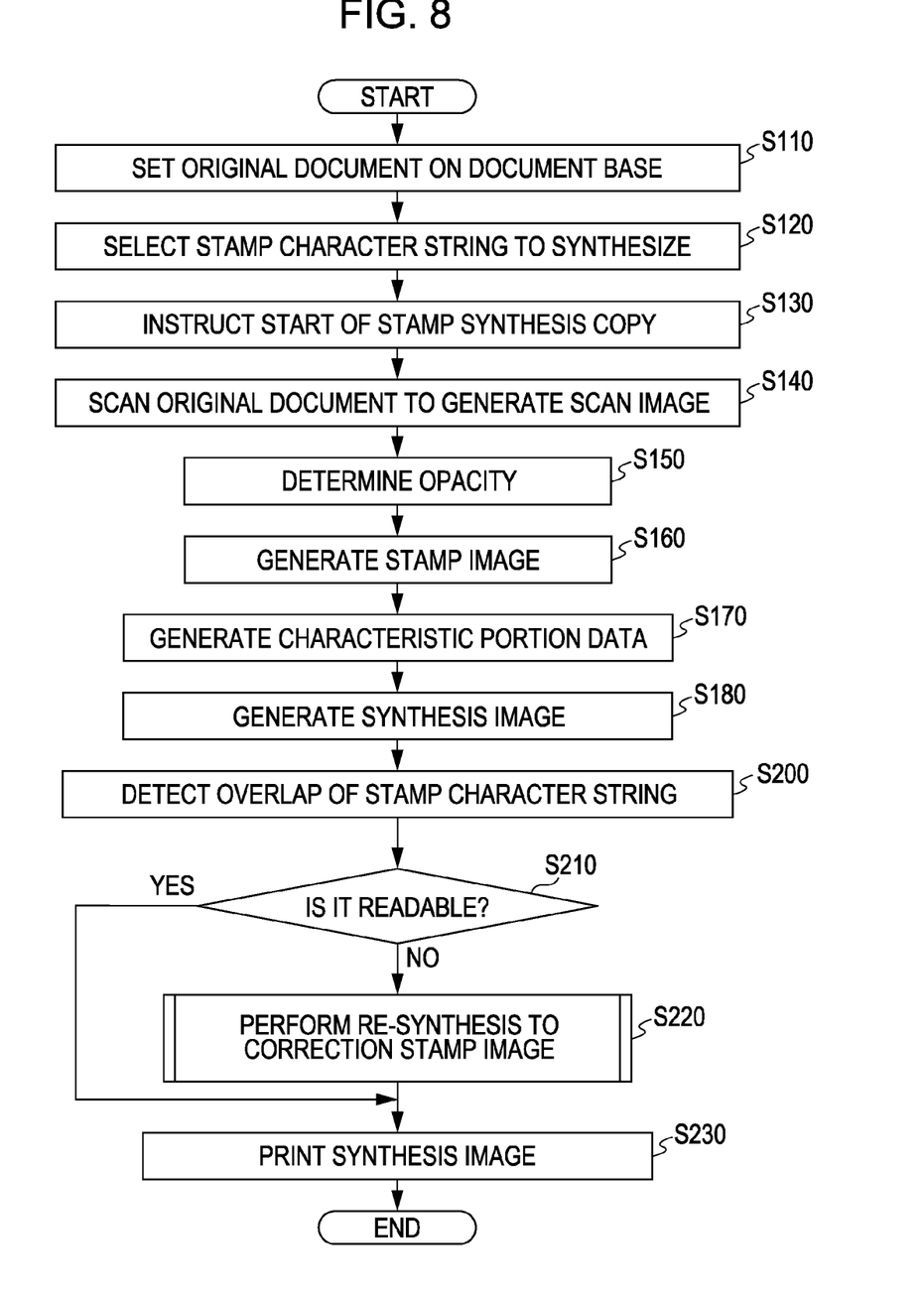
FIG. 8 is a flowchart illustrating a process sequence of stamp synthesis copying.

FIG. 8 is a flowchart illustrating a process sequence when stamp synthesis copying is performed using the image processing apparatus 1 according to the embodiment.

First, a user sets an original document on a document base (S110).

The user operates the operation panel 40 to select a stamp character string to be synthesized with the original document as stamp printing setting (S120). The user instructs the image processing apparatus 1 to start the stamp synthesis copying (S130).

When the scanner unit 20 receives the instruction for the start of the stamp synthesis copying, first, the scanner unit 20 scans the original document on the document base to generate a scan image (S140). The image data of the scan image generated herein is stored in the scan image data storing unit 501.

The opacity data generating unit 506 determines opacity on the basis of the scan image data of the scan image data storing unit 501 (S150). The opacity data relating to the opacity is stored in the opacity data storing unit 507.

The stamp image generating unit 503 generates a stamp image according to the stamp printing setting (S160). The image data of the stamp image is stored in the stamp image data storing unit 504. In addition, the stamp image generating unit 503 extracts characteristic portions of the stamp character string included in the stamp image, and generates characteristic portion data of the stamp characters indicating the positional coordinates of the characteristic portions in the stamp image (S170). The characteristic data is stored in the stamp characteristic portion data storing unit 505.

The synthesis image generating unit 508 synthesizes the scan image data of the scan image data storing unit 501 and the stamp image data of the stamp image data storing unit 504 to generate synthesis image data (S180). The synthesis image data is stored in the synthesis image data storing unit 509.

The overlap determining unit 510 detects an overlap of the stamp character string and the pixels having a pixel value of the scan image equal to or more than a predetermined value in the synthesis image (S200) to determine whether or not the stamp character string is readable (S210). For example, as described above, the overlap determining unit 510 determines whether or not the stamp character string is readable for each kind of the elemental characters according to whether or not at least one or more characters are overlapped with the pixels having the pixel value of the scan image equal to or more than the predetermined value.

When the overlap determining unit 510 determines that the stamp character string is readable (S210: Yes), the following step S220 is skipped, the printer unit 30 prints the synthesis image on the basis of the synthesis image data of the synthesis image data storing unit 509 (S230).

When the overlap determining unit 510 determines that the stamp character string is not readable (S210: No), the stamp image generating unit 503 generates a correction stamp image, and generates the synthesis image again (S220). Then, the printer unit 30 prints the re-synthesized synthesis image (S230).

When a plurality of pages is continuously copied, the step S140 and subsequent steps are repeatedly performed for each page.

Figure 9:
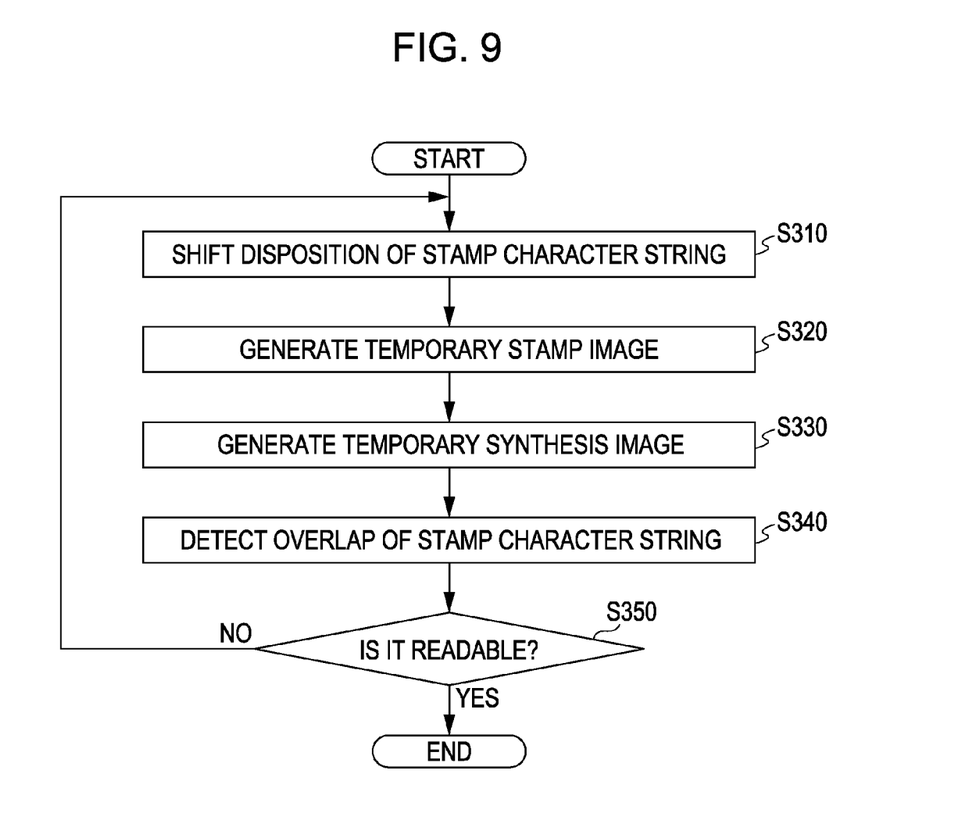
FIG. 9 is a flowchart illustrating a process sequence of correction stamp image generation.

FIG. 9 is a flowchart illustrating a detailed process sequence of the re-synthesis in the correction stamp image in the step S220.

First, the stamp image generating unit 503 horizontally or vertically shifts the disposition of the stamp character string in the stamp image by a predetermined amount of several pixels to generate a temporary stamp image (S310 and S320).

The synthesis image generating unit 508 synthesizes the scan image data of the scan image data storing unit 501 and the image data of the temporary stamp image generated in the step S320 to generate a temporary synthesis image (S330).

The overlap determining unit 510 detects an overlap of the stamp character string in the temporary synthesis image in the same manner as the step S200 (S340).

In this case, the overlap determining unit 510 determines whether or not the stamp character string is readable in the same manner as the step S210 (S350). When the stamp character string is readable (S350: Yes), the process is ended. Meanwhile, when the stamp character string is not readable (S350: No), the process returns to the step S310, and the above-described processes are repeated.

Accordingly, the synthesis image formed by synthesizing the correction stamp image in which the stamp character string is readable is generated.

According to the embodiment, even when the stamp character string is covered by the scan image and is hardly readable, the synthesis image is generated by the correction stamp image in which the stamp character string is moved to the easily readable place. Accordingly, the user can reliably read the stamp character string in copies of the stamp character strings generated by the embodiment.

When a plurality of pages is continuously copied, the step S140 and subsequent steps are applied to each page. That is, the flowchart of FIG. 9 is performed for each page, and thus the correction stamp image is generated for each page.

The above-described embodiment of the invention is an example for description of the invention, and the scope of the invention is not limited to only the embodiment. A person skilled in the art can embody the invention in various aspects without deviating from the main concept of the invention.

For example, in the embodiment, the scan image is overlapped to be disposed on the front face of the stamp image, but on the contrary, the stamp image may be overlapped to be disposed on the front face of the scan image. In the embodiment, the opacity data is generated from the scan image and the overlap of the scan image and the stamp image is determined, but the scan image and the stamp image may be directly compared without using the opacity data.

The entire disclosure of Japanese Patent Application No. 2010-26266, filed Feb. 9, 2010 is expressly incorporated by reference herein.

What is claimed is:

1. An image processing apparatus comprising:
    a storage unit that stores a first image including a stamp character string including one or more elemental characters;
    a determination unit that determines whether or not the stamp character string is readable using image data of the first image and image data of a second image read by a scanner when the first image and the second image are overlapped;
    a generation unit that generates a third image obtained by correcting the first image to improve readability of the stamp characters using the image data of the first image when the determination unit determines that the stamp character string is not readable; and
    a synthesis unit that generates a synthesis image in which the second image and the third image are overlapped;
    wherein the generation unit shifts the stamp character string of the first image in a parallel manner to generate the third image such that any of two or more continuous characters of the elemental character constituting each stamp character string are not overlapped with a pixel of the second image having a pixel value greater than or equal to a predetermined value when the number of elemental characters is 3 or more.

2. The image processing apparatus according to claim 1, wherein the determination unit determines that the stamp character string is readable when at least one or more characters for each kind of elemental character constituting the stamp character string are not overlapped with a pixel having a pixel value of the second image equal to or more than a predetermined value.

3. The image processing apparatus according to claim 1, wherein the generation unit shifts the stamp character string of the first image in a parallel manner to generate the third image such that at least one or more characters for each kind of elemental character constituting the stamp character string are not overlapped with a pixel having a pixel value of the second image equal to or more than a predetermined value.

4. The image processing apparatus according to claim 1, wherein the determination unit determines that the stamp character string is readable when at least one character for each kind of elemental character constituting the stamp character string is readable, and determines that the elemental characters are readable when the number of pixels of an intersection point and isolation pixels in the elemental characters that overlap with pixels of the second image having pixel values equal to or more than a predetermined value is equal to or less than a predetermined number.

5. The image processing apparatus according to claim 1, wherein when the scanner continuously reads a plurality of pages of the second image, the determination unit determines whether or not the stamp character string is readable for each of the plurality of pages, and the generation unit generates the third image for each page for which the determination unit determines that the stamp character string is not readable.

6. An image processing method performed by an image processing apparatus provided with an image forming unit forming an image read by a scanner on a printing medium, comprising:
    determining whether or not a stamp character string is readable using image data of a first image including a plurality of stamp character strings including one or more elemental characters and image data of a second image read by the scanner when the first image and the second image are overlapped;

generating a third image obtained by correcting the first image to improve readability of the stamp characters using the image data of the first image when it is determined that the stamp character string is not readable by the determination; and generating a synthesis image in which the second image and the third image are overlapped using the image data of the second image and image data of the third image;

wherein the determining step further comprises determining that the stamp character string is readable when at least one character for each kind of elemental character constituting the stamp character string is readable, and determining that the elemental characters are readable when the number of pixels of an intersection point and isolation pixels in the elemental characters that overlap with pixels of the second image having pixel values equal to or more than a predetermined value is equal to or less than a predetermined number.

7. A non-transitory recording medium in which a computer program executed by an image processing apparatus provided with an image forming unit forming an image read by a scanner on a printing medium is recorded, the computer program causing the image processing apparatus to execute:

determining whether or not a stamp character string is readable using image data of a first image including a plurality of stamp character strings including one or more elemental characters and image data of a second image read by the scanner when the first image and the second image are overlapped;

generating a third image obtained by correcting the first image to improve readability of the stamp characters using the image data of the first image when it is determined that the stamp character string is not readable by the determination; and generating a synthesis image in which the second image and the third image are overlapped using the image data of the second image and image data of the third image;

wherein the step of generating the third image further comprises shifting the stamp character string of the first image in a parallel manner to generate the third image such that an of two or ore continuous characters of the elemental character constituting each stamp character string are not overlapped with a pixel of the second image having a pixel value greater than or equal to a predetermined value when the number of elemental characters is 3 or more.

\* \* \* \* \*